(12) United States Patent
Sambhwani

(10) Patent No.: US 8,767,797 B2
(45) Date of Patent: Jul. 1, 2014

(54) APPARATUS AND METHOD FOR PROVIDING HARQ FEEDBACK IN A MULTI-CARRIER WIRELESS COMMUNICATION SYSTEM

(75) Inventor: Sharad Deepak Sambhwani, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 12/897,460

(22) Filed: Oct. 4, 2010

(65) Prior Publication Data
US 2011/0116530 A1    May 19, 2011

Related U.S. Application Data

(60) Provisional application No. 61/248,666, filed on Oct. 5, 2009.

(51) Int. Cl.
| | |
|---|---|
| *H04B 1/00* | (2006.01) |
| *H04B 7/00* | (2006.01) |
| *H04L 5/00* | (2006.01) |
| *H04L 1/16* | (2006.01) |
| *H04L 1/18* | (2006.01) |

(52) U.S. Cl.
CPC .......... *H04L 5/0053* (2013.01); *H04L 1/1607* (2013.01); *H04L 1/1854* (2013.01)
USPC .......................................... 375/146; 370/310

(58) Field of Classification Search
USPC ................... 375/145, 260, 146; 370/310, 345
See application file for complete search history.

(56) References Cited

U.S. PATENT DOCUMENTS

| | | | |
|---|---|---|---|
| 2005/0250511 A1* | 11/2005 | Xiao et al. | ..................... 455/453 |
| 2008/0144561 A1 | 6/2008 | Kaikkonen et al. | |
| 2009/0316807 A1 | 12/2009 | Kim et al. | |

(Continued)

FOREIGN PATENT DOCUMENTS

| | | |
|---|---|---|
| CN | 101385269 A | 3/2009 |
| CN | 101399644 A | 4/2009 |

(Continued)

OTHER PUBLICATIONS

International Search Report and Written Opinion—PCT/US2010/051535, International Search Authority—European Patent Office—Jan. 28, 2011.

(Continued)

*Primary Examiner* — Chieh M Fan
*Assistant Examiner* — Brian J Stevens
(74) *Attorney, Agent, or Firm* — Darren M. Simon

(57) ABSTRACT

A method and apparatus provide hybrid automatic repeat request (HARQ) feedback corresponding to the status of multiple downlink carriers, with or without MIMO being configured. Here, for at least some configurations, with respect to the selection of HARQ feedback symbols, the downlink carriers are grouped into groups of one or two carriers such that HARQ feedback symbol code books that were previously implemented in conventional HSDPA or DC-HSDPA systems may be utilized. That is, after encoding a data stream, HARQ feedback symbols selected from a plurality of code books configured for groups of one or two of the downlink carriers are utilized to modulate an uplink channel. The modulation or channelization may be accomplished with dual channelization codes or a single channelization code with a reduced spreading factor to insert two symbols into a single time slot.

31 Claims, 8 Drawing Sheets

Frame structure for uplink HS-DPCCH

(56) References Cited

U.S. PATENT DOCUMENTS

| | | | |
|---|---|---|---|
| 2010/0035625 A1 * | 2/2010 | Damnjanovic et al. | 455/450 |
| 2010/0284364 A1 | 11/2010 | You et al. | |
| 2012/0002658 A1 | 1/2012 | Fan et al. | |

FOREIGN PATENT DOCUMENTS

| | | | | |
|---|---|---|---|---|
| JP | 2008543147 A | | 11/2008 | |
| JP | 2010078425 A | | 4/2010 | |
| RU | 2309538 C2 | | 10/2007 | |
| RU | 2316116 C2 | | 1/2008 | |
| RU | 2352073 C2 | | 4/2009 | |
| WO | WO 2006105308 | * | 3/2006 | H04L 5/02 |
| WO | 2006102308 A2 | | 9/2006 | |
| WO | WO2006105308 A2 | | 10/2006 | |
| WO | 2006126078 A2 | | 11/2006 | |
| WO | WO 2007081181 A2 * | | 7/2007 | |
| WO | WO2008085000 A1 | | 7/2008 | |
| WO | PCT/CN2009/071639 | * | 5/2009 | |
| WO | WO 2009086668 A1 * | | 7/2009 | H04Q 11/04 |

OTHER PUBLICATIONS

LG Electronics: "UL control channel design to support carrier aggregation", 3GPP Draft; R1-091204 LTEA_UL Control Channel Design, 3rd Generation Partnership Project (3GPP). Mobile Competence Centre ; 650, Route des Lucioles ; F-06921 Sophia-Antipolis Cedex ; France, No. Seoul, Korea; 20090317, Mar. 17, 2009, XP050338819,[retrieved on Mar. 17, 2009].

ZTE: "Uplink Control Channel Design for LTE-Advanced", 3GPP Draft; R1-091427 Uplink Control, Channel Design for LTE-A, 3rd Generation Partnership Project (3GPP), Mobile Competence Centre ; 650, Route des Lucioles ; F-06921 Sophia-Antipolis Cedex ; France, No. Seoul, Korea; 20090317, Mar. 17, 2009, XP050339006, [retrieved on Mar. 17, 2009].

Taiwan Search Report—TW099133910—TIPO—Aug. 12, 2013.

* cited by examiner

Frame structure for uplink HS-DPCCH

APPARATUS AND METHOD FOR PROVIDING HARQ FEEDBACK IN A MULTI-CARRIER WIRELESS COMMUNICATION SYSTEM

CROSS-REFERENCE TO RELATED APPLICATION(S)

This application claims the benefit of U.S. Patent Application No. 61/248,666, entitled "HS-DPCCH ACK/NACK CODE BOOK DESIGN FOR 4C-HSDPA," filed on Oct. 5, 2009, which is expressly incorporated by reference herein in its entirety.

BACKGROUND

1. Field

Aspects of the present disclosure relate generally to wireless communication systems, and more particularly, to the provision of feedback information in a multiple carrier wireless communication system.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSDPA), which provides higher data transfer speeds and capacity to associated UMTS networks.

As the demand for mobile broadband access continues to increase, research and development continue to advance the UMTS technologies not only to meet the growing demand for mobile broadband access, but to advance and enhance the user experience with mobile communications.

SUMMARY

A method and apparatus provide hybrid automatic repeat request (HARQ) feedback corresponding to the status of multiple downlink carriers, with or without MIMO being configured. Here, for at least some configurations, with respect to the selection of HARQ feedback symbols, the downlink carriers are grouped into groups of one or two carriers such that HARQ feedback symbol code books that were previously implemented in conventional HSDPA or DC-HSDPA systems may be utilized. That is, after encoding a data stream, HARQ feedback symbols selected from a plurality of code books configured for groups of one or two of the downlink carriers are utilized to modulate an uplink channel. The modulation or channelization may be accomplished with dual channelization codes or a single channelization code with a reduced spreading factor to insert two symbols into a single time slot.

In one aspect, the disclosure provides a method of wireless communication that includes receiving downlink signaling on a plurality of downlink carriers and determining hybrid automatic repeat request (HARQ) feedback corresponding to each of the plurality of carriers. A first HARQ feedback symbol is selected for encoding HARQ feedback corresponding to a first subset of the plurality of carriers. Here, the first subset includes at least two of the plurality of carriers. A second HARQ feedback symbol is selected for encoding HARQ feedback corresponding to a second subset of the plurality of carriers. Here, the second subset includes at least one of the plurality of carriers. The first and second HARQ feedback symbols are transmitted on an uplink.

Another aspect of the disclosure provides a method of wireless communication that includes providing a first feedback symbol corresponding to a status of decoding information received on a plurality of downlink carriers, and providing a second feedback symbol corresponding to a status of decoding information received on at least one downlink carrier.

Yet another aspect of the disclosure provides an apparatus for wireless communication that includes a receiver for receiving downlink signaling on a plurality of downlink carriers. A processor determines hybrid automatic repeat request (HARQ) feedback corresponding to each of the plurality of carriers, selects a first HARQ feedback symbol for encoding HARQ feedback corresponding to a first subset of the plurality of carriers comprising at least two of the plurality of carriers, and selects a second HARQ feedback symbol for encoding HARQ feedback corresponding to a second subset of the plurality of carriers comprising at least one of the plurality of carriers. A transmitter transmits the first and second HARQ feedback symbols on an uplink.

Still another aspect of the disclosure provides an apparatus for wireless communication that includes means for receiving downlink signaling on a plurality of downlink carriers, and means for determining hybrid automatic repeat request (HARQ) feedback corresponding to each of the plurality of carriers. Further, the apparatus includes means for selecting a first HARQ feedback symbol for encoding HARQ feedback corresponding to a first subset of the plurality of carriers comprising at least two of the plurality of carriers, means for selecting a second HARQ feedback symbol for encoding HARQ feedback corresponding to a second subset of the plurality of carriers comprising at least one of the plurality of carriers, and means for transmitting the first and second HARQ feedback symbols on an uplink.

Still another aspect of the disclosure provides an apparatus for wireless communication that includes means for providing a first feedback symbol corresponding to a status of decoding information received on a plurality of downlink carriers and means for providing a second feedback symbol corresponding to a status of decoding information received on at least one downlink carrier.

Yet another aspect of the disclosure provides a computer program product that includes a computer-readable medium having instructions for causing a computer to receive downlink signaling on a plurality of downlink carriers, to determine hybrid automatic repeat request (HARQ) feedback corresponding to each of the plurality of carriers, to select a first HARQ feedback symbol for encoding HARQ feedback corresponding to a first subset of the plurality of carriers comprising at least two of the plurality of carriers, to select a second HARQ feedback symbol for encoding HARQ feedback corresponding to a second subset of the plurality of carriers comprising at least one of the plurality of carriers, and to transmit the first and second HARQ feedback symbols on an uplink.

Yet another aspect of the disclosure provides an apparatus for wireless communication that includes at least one processor and a memory coupled to the at least one processor. Here, the at least one processor is configured to receive downlink signaling on a plurality of downlink carriers, to determine hybrid automatic repeat request (HARQ) feedback corresponding to each of the plurality of carriers, to select a first HARQ feedback symbol for encoding HARQ feedback corresponding to a first subset of the plurality of carriers including at least two of the plurality of carriers, to select a second HARQ feedback symbol for encoding HARQ feedback corresponding to a second subset of the plurality of carriers including at least one of the plurality of carriers, and to transmit the first and second HARQ feedback symbols on an uplink.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
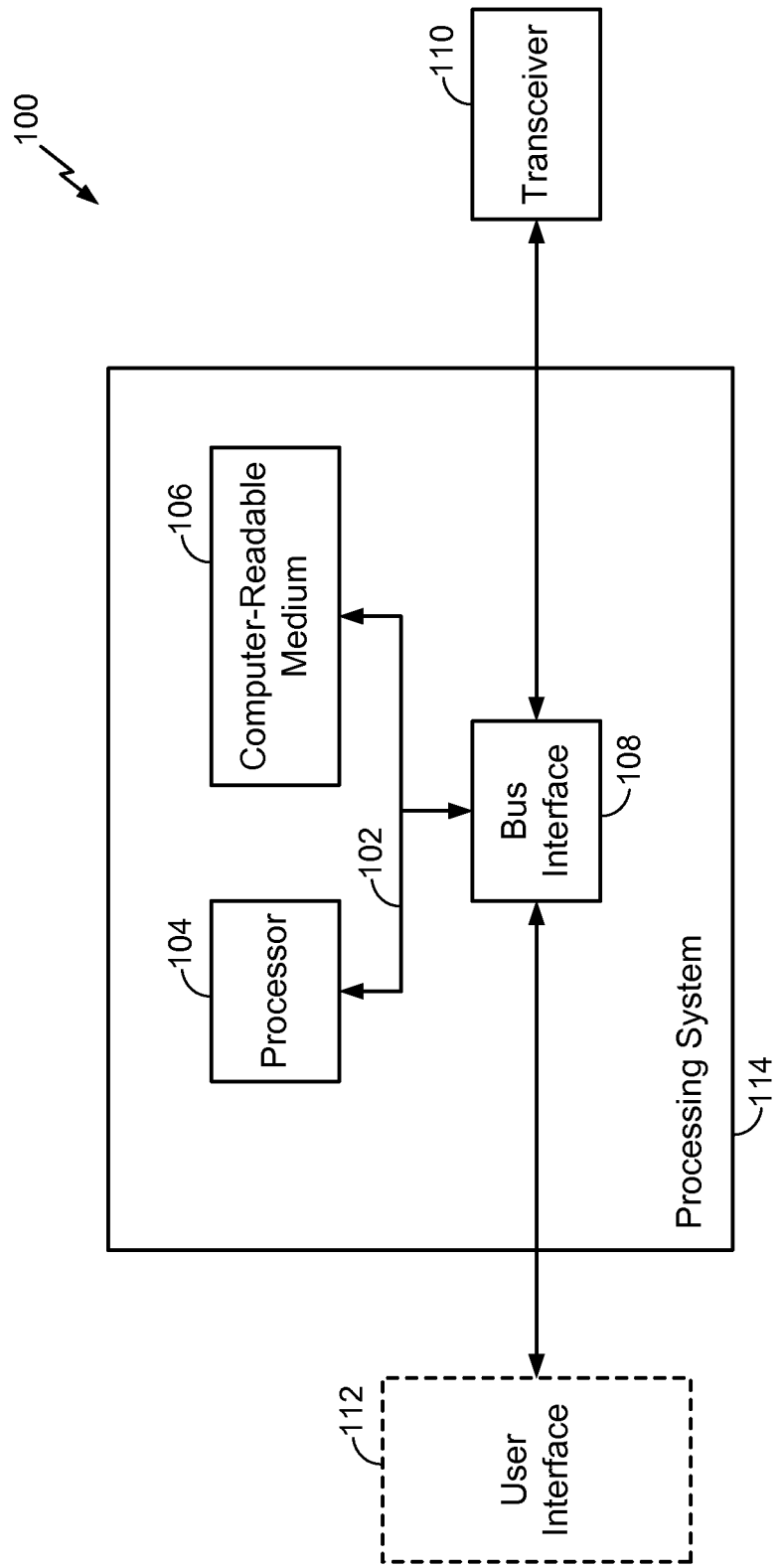
FIG. 1 is a diagram illustrating an example of a hardware implementation for an apparatus employing a processing system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
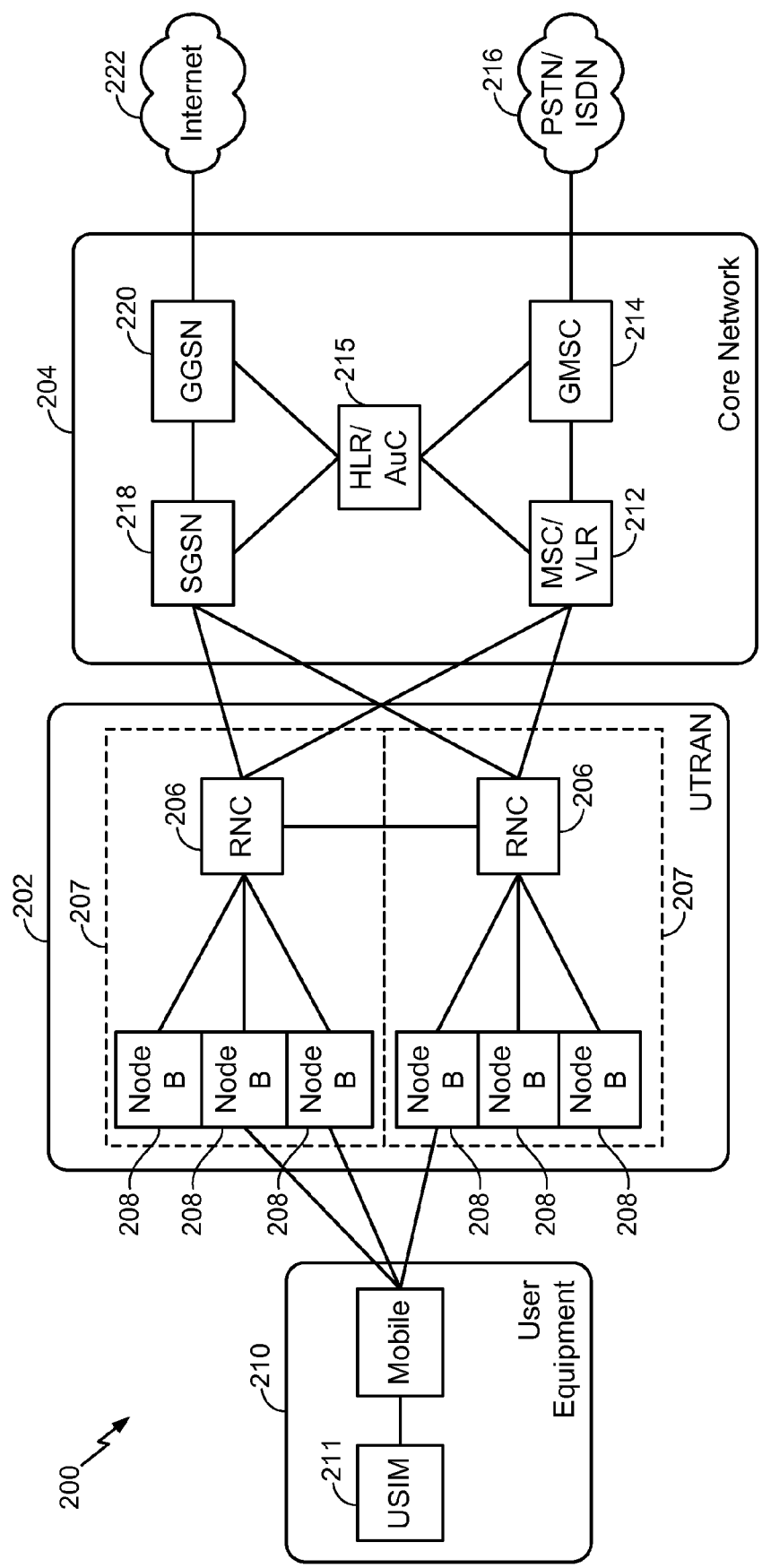
FIG. 2 is a block diagram conceptually illustrating an example of a telecommunications system.

The various concepts presented throughout this disclosure may be implemented across a broad variety of telecommunication systems, network architectures, and communication standards. By way of example and without limitation, the aspects of the present disclosure illustrated in FIG. 2 are presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Communication between a UE 210 and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in Radio Resource Control (RRC) Protocol Specification, 3GPP TS 25.331 v9.1.0, incorporated herein by reference.

The geographic region covered by the SRNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each SRNS 207; however, the SRNSs 207 may include any number of wireless Node Bs. The Node Bs 208 provide wireless access points to a core network (CN) 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The downlink (DL), also called the forward link, refers to the communication link from a Node B 208 to a UE 210, and the uplink (UL), also called the reverse link, refers to the communication link from a UE 210 to a Node B 208.

The core network 204 interfaces with one or more access networks, such as the UTRAN 202. As shown, the core network 204 is a GSM core network. However, as those skilled in the art will recognize, the various concepts presented throughout this disclosure may be implemented in a RAN, or other suitable access network, to provide UEs with access to types of core networks other than GSM networks.

The core network 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the core network 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a visitor location register (VLR) that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The core network 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

The UMTS air interface is a spread spectrum Direct-Sequence Code Division Multiple Access (DS-CDMA) system. The spread spectrum DS-CDMA spreads user data through multiplication by a sequence of pseudorandom bits called chips. The W-CDMA air interface for UMTS is based on such direct sequence spread spectrum technology and additionally calls for a frequency division duplexing (FDD). FDD uses a different carrier frequency for the uplink (UL) and downlink (DL) between a Node B 208 and a UE 210. Another air interface for UMTS that utilizes DS-CDMA, and uses time division duplexing, is the TD-SCDMA air interface. Those skilled in the art will recognize that although various examples described herein may refer to a WCDMA air interface, the underlying principles are equally applicable to a TD-SCDMA air interface.

The HSPA configuration utilized in this example includes a series of enhancements to the 3G/WCDMA air interface, facilitating greater throughput and reduced latency. Among other modifications over prior releases, HSPA utilizes hybrid automatic repeat request (HARM), shared channel transmission, and adaptive modulation and coding. The standards that define HSPA include HSDPA (high speed downlink packet access) and HSUPA (high speed uplink packet access).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Figure 3:
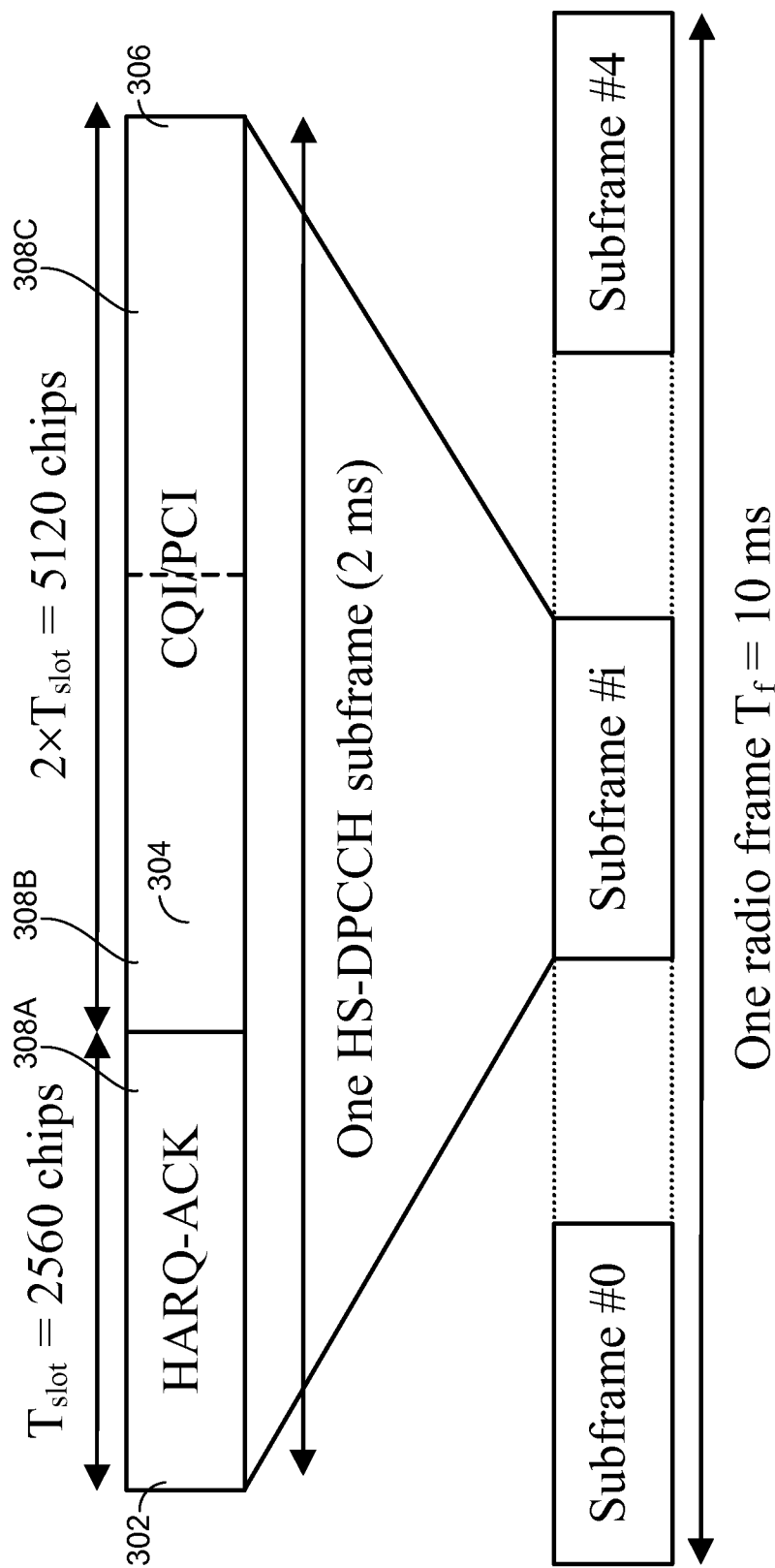
FIG. 3 is a block diagram conceptually illustrating the frame structure of the uplink high speed dedicated physical control channel (HS-DPCCH).

Among these physical channels, the HS-DPCCH may carry uplink feedback signaling related to downlink HS-DSCH transmissions and to HS-SCCH orders. For example, FIG. 3 illustrates the frame structure of the HS-DPCCH in accordance with an exemplary aspect of the disclosure. The feedback signaling may include Hybrid-ARQ Acknowledgement (HARQ-ACK) 302 and Channel-Quality Indication (CQI) 304, and in case the UE is configured in MIMO mode, Precoding Control Indication (PCI) 306. Each sub frame (e.g., having a length of 2 ms (3*2560 chips)) may include 3 slots 308A, 308B, and 308C, each slot 308 having a length of 2560 chips. The HARQ-ACK 302 may be carried in the first slot 308A of the HS-DPCCH sub-frame. The CQI 304, and in case the UE is configured in MIMO mode, also the PCI 306, may be carried in the second and/or third slot 308B and 308C of the HS-DPCCH sub-frame.

In a typical direct sequence code division multiple access (DS-CDMA) system such as HSPA, data signals on both the uplink and the downlink are each combined with a respective spreading code having a certain chip rate, to separate a plurality of simultaneous transmissions from each other and enable recovery of the individual data signals. For example, on a given downlink carrier, a data stream intended for a given user may be spread by the application of an appropriate spreading code. At the receiving end of the signal, the signal is descrambled and the data stream is recovered by the application of the appropriate spreading code. By utilizing a plurality of spreading codes, multiple codes may be assigned to each subscriber, enabling multiple services to be delivered simultaneously. Similarly, on the uplink, multiple streams may be transmitted from a UE on the same channel by the application of a plurality of channelization codes.

In an aspect of the disclosure, an appropriate choice of a channelization code may enable the encoding of additional information in a data stream. For example, two forms of channelization code may be utilized in a HSDPA link: one for the precoding control indication (PCI) and channel quality indication (CQI), and another for the HARQ ACK/NACK (acknowledgement/non-acknowledgement) or DTX (discontinuous transmission) indicators.

In particular, the channelization code corresponding to the HARQ feedback may utilize a suitable number of bits to encode the HARQ ACK/NACK/DTX status for each transport block on each of the carriers on the downlink. In a conventional W-CDMA system, 10 code bits are utilized for HARQ feedback, utilizing a channelization code with a spreading factor (SF) of 256 chips per symbol.

Systems utilizing HSDPA may implement multiple carriers (3GPP uses the term "cell" to refer to a carrier), e.g., 4C-HSDPA for a 4-carrier system, or more generally, MC-HSDPA for multiple cells, wherein a plurality of HS-DSCH channels over different carriers may be utilized. That is, a UE may be scheduled in a serving HS-DSCH cell as well as in one or more secondary serving HS-DSCH cells over parallel HS-DSCH transport channels from the same node B. Of course, those skilled in the art will comprehend that any one of the plurality of carriers may be configured to function as the serving HS-DSCH cell or the secondary serving HS-DSCH cell for a particular UE. Here, data rates and system capacity may each be increased in comparison to systems that only utilize a single carrier for the downlink.

For MC-HSDPA systems, HARQ ACK/NACK feedback signaling may be sent separately for each downlink channel, or jointly as a composite HARQ ACK/NACK corresponding to two or more downlink channels. For a system that encodes HARQ ACK/NACK according to the selection of channelization codes, as described above, if the HARQ ACK/NACK is sent separately for each downlink carrier, the UE may utilize plural channelization codes. When utilizing plural channelization codes, each channelization code may be adapted to provide the HARQ ACK/NACK for one respective downlink carrier.

However, a DC-HSDPA system may implement one or more channelization codes that can provide composite HARQ ACK/NACK information as feedback corresponding to a plurality of downlink carriers. Here, the channelization code may be selected from a code book wherein each code symbol corresponds to a composite HARQ ACK/NACK, that is, an ACK/NACK corresponding to each of a plurality of the downlink carriers at once.

HSPA+, or evolved HSPA, is an evolution of the HSPA standard that includes Multiple Input Multiple Output (MIMO) and 64-QAM, enabling increased throughput and higher performance. That is, in an aspect of the disclosure, the node B 208 and/or the UE 210 (see FIG. 2) may have multiple antennas supporting MIMO technology. The use of MIMO technology enables the node B 208 to exploit the spatial domain to support spatial multiplexing, beamforming, and transmit diversity.

MIMO is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 transmits a spatially precoded data stream, which enables the node B 208 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier. Utilizing this terminology, a Single Input Single Output system (SISO) is one that utilizes a single transmit and receive antenna.

When MIMO is possible to be implemented across one or more of a plurality of carriers, HARQ-ACK feedback can become quite cumbersome. That is, the number of ACK/NACK hypotheses that the UE may utilize in order to respond to different scheduling scenarios involving SIMO and MIMO transmissions from a Node B can become quite large. To illustrate, Table 1 enumerates HARQ-ACK hypotheses for a 3C-HSDPA Node B that schedules SIMO transmissions on two carriers and MIMO transmissions (including two transport blocks) on a third carrier (S/S/M). On each of the two SIMO carriers, HARQ feedback may be an ACK, an NACK, or an indication that no signal was received on that carrier (called discontinuous transmission, DTX). On the MIMO carrier, HARQ feedback may be an ACK for one or both of the two transport blocks depending on what was received, an ACK for one transport block and a NACK for the other transport block, or a DTX if neither transport block was received. For this relatively simple system with only one MIMO carrier out of three carriers, there are 44 HARQ hypotheses to cover all possible feedback, not including the conventional PRE/POST indication that may add two more hypotheses to this number.

TABLE 1

| | Detection Hypothesis at the UE: S/S/M |
|---|---|
| 1 | A/D/D |
| 2 | N/D/D |
| 3 | D/A/D |
| 4 | D/N/D |
| 5 | D/D/AA |
| 6 | D/D/AN |
| 7 | D/D/NA |
| 8 | D/D/NN |
| 9 | A/A/D |
| 10 | A/N/D |
| 11 | N/A/D |
| 12 | N/N/D |
| 13 | A/D/AA |
| 14 | A/D/AN |
| 15 | A/D/NA |
| 16 | A/D/NN |
| 17 | N/D/AA |
| 18 | N/D/AN |
| 19 | N/D/NA |
| 20 | N/D/NN |
| 21 | D/A/AA |
| 22 | D/A/AN |
| 23 | D/A/NA |
| 24 | D/A/NN |
| 25 | D/N/AA |
| 26 | D/N/AN |
| 27 | D/N/NA |
| 28 | D/N/NN |
| 29 | A/A/AA |
| 30 | A/N/AA |
| 31 | N/A/AA |
| 32 | N/N/AA |
| 33 | A/A/AN |
| 34 | A/N/AN |
| 35 | N/A/AN |
| 36 | N/N/AN |
| 37 | A/A/NA |
| 38 | A/N/NA |
| 39 | N/A/NA |
| 40 | N/N/NA |
| 41 | A/A/NN |
| 42 | A/N/NN |
| 43 | N/A/NN |
| 44 | N/N/NN |

Furthermore, a code book for encoding HARQ feedback may be even larger than the number of HARQ hypotheses for a given system. That is, in the above example with two SIMO carriers and one MIMO carrier (abbreviated as S/S/M), the UE should have a response ready not only for an S/S/M transmission, but also to S/S/S transmissions, since the UE may only receive one of the transport blocks scheduled on the MIMO channel, without having received an indication that that channel was indeed a MIMO channel. For the example of a S/S/M system, the ACK/NACK/DTX code book size includes 62 unique code words, excluding PRE/POST.

As can be seen from this description, the number of HARQ hypotheses rapidly grows as the number of carriers grows, and when more of the carriers may have MIMO configured. In a 4C-HSDPA system with MIMO configured on all four carriers, a code book having 2320 unique code words, excluding PRE/POST, is needed.

Theoretically, the most optimal solution for providing HARQ feedback in an MC-HSDPA system would be to create a single codebook and to jointly encode the ACK/NACK feedback for all of the carriers. That is, according to an exemplary aspect of the disclosure, a single channelization code may be utilized on the HS-DPCCH, with the conventional spreading factor SF=256, wherein a new code book is designed to encode the HARQ feedback for each of the plurality of carriers.

However, the code rate corresponding to transmitting 4C-HSDPA code words on a single channelization code is essentially one. That is, while there are generally 10 symbols per ACK/NACK slot, more than 10 bits are needed, for example, for the 2320 unique code words needed for a 4C-HSDPA system with MIMO enabled.

According to an aspect of the disclosure, from a practical point of view, it makes sense to jointly encode feedback for groups of two carriers at a time. That is, substantial time and effort have been spent in previous versions of 3GPP specifications to create efficient code books for up to two carrier systems (i.e., DC-HSDPA). In this way, existing code books already implemented in UE hardware can be re-used to provide HARQ feedback in HSDPA systems with greater than two carriers and MIMO.

In an aspect of the disclosure, plural channelization codes may be utilized to provide HARQ feedback, wherein each channelization code is adapted to provide HARQ feedback for a group of one or two carriers. For example, in a 3C-HSDPA or a 4C-HSDPA system, dual channelization codes may be utilized, wherein each channelization code provides HARQ feedback for a group of one or two downlink carriers.

In another aspect of the disclosure, a single channelization code may be utilized, with a reduction of the spreading factor SF below the conventional SF=256. In this way, when the spreading factor SF is less than 256, the number of symbols per ACK/NACK slot can be increased beyond 10, and thus, a code book adequate to encode HARQ feedback for 4C-HSDPA+MIMO is possible. In a further aspect, the spreading factor is set to SF=128. In this way, the number of symbols that the ACK/NACK time slot may carry is doubled to 20, thus enabling two HARQ-ACK code words to be inserted into the ACK/NACK time slot. Here, each of the two HARQ-ACK code words may correspond to a composite ACK/NACK for a group of one or two downlink carriers, in a similar fashion as described above in the case of the utilization of dual channelization codes.

In yet another aspect of the disclosure, the above aspects may be combined, for example, designing a new code book with a single channelization code and the conventional SF=256 for one or more configurations (e.g., 3-carriers configured as S/S/S in one example), while utilizing other aspects for other configurations (e.g., utilizing a spreading factor reduction to SF=128 for 3-carrier or 4-carrier configurations in all configurations other than S/S/S). Of course, other combinations of the above aspects may be combined within the scope of the instant disclosure.

Figure 4:
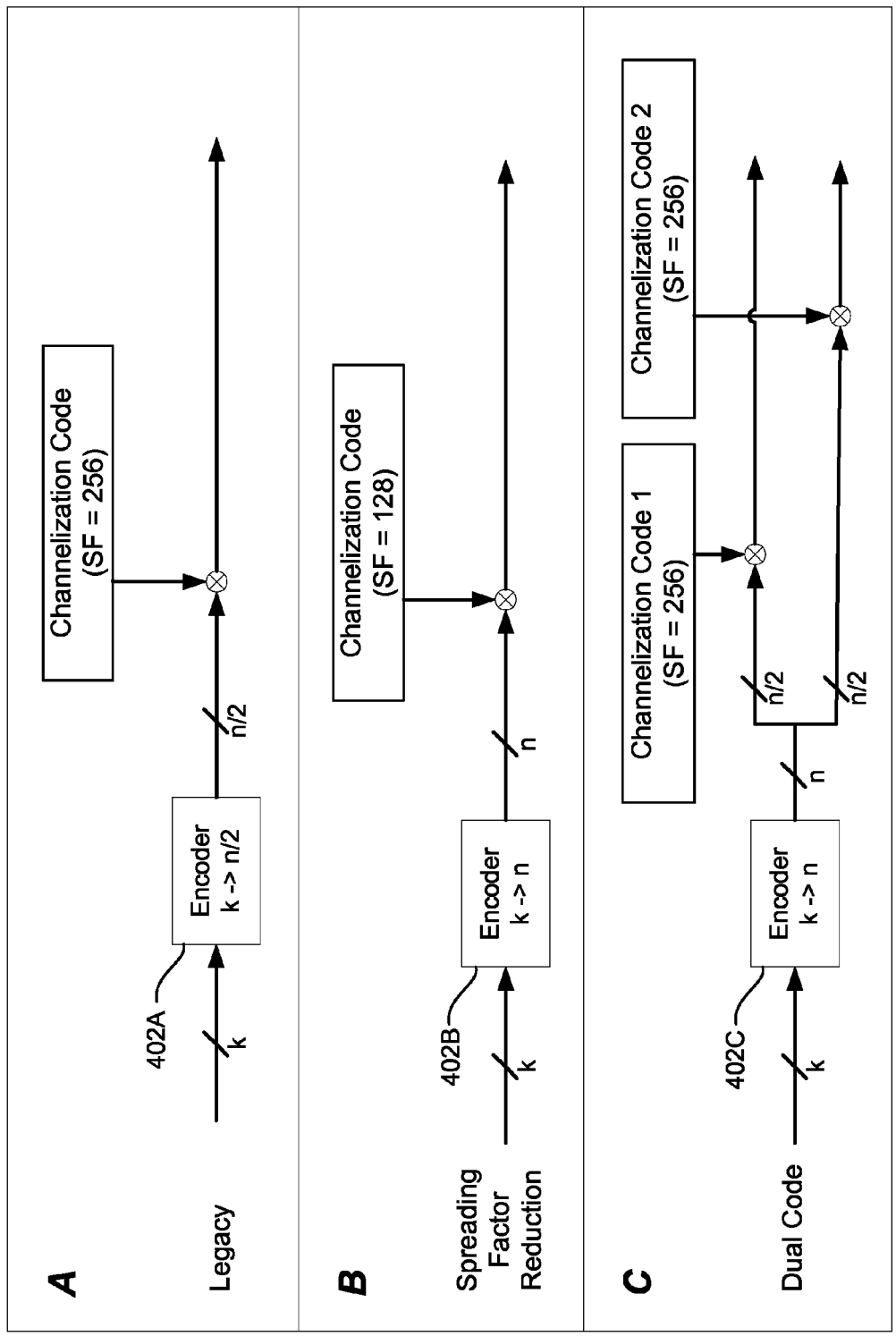
FIG. 4 is a block diagram conceptually illustrating three exemplary channelization schemes for encoding HARQ feedback onto the HS-DPCCH.

FIG. 4 illustrates three schemes for implementing HARQ feedback in accordance with various aspects of the disclosure. Box A represents the legacy case utilizing a single channelization code with a spreading factor SF=256; box B represents a case utilizing a single channelization code with a reduced spreading factor to SF=128; and box C represents a case utilizing dual channelization codes, each having a spreading factor SF=256.

In each of the cases illustrated in FIG. 4, k bits of information are fed into an encoder 402, which may encode the information, for example, utilizing various forward error correction schemes or any other suitable coding as known to those skilled in the art. In box A, the encoder 402A is configured to encode the k bits of input information to result in an output of n/2 bits of encoded information. The n/2 bits are then combined with a single channelization code, having a spreading factor of SF=256, as in a legacy system. As discussed above, a codebook from which the channelization code is selected for the appropriate HARQ feedback in accordance with the HARQ scenario may be implemented in such a way as to substantially optimize characteristics on the uplink transmission.

In boxes B and C, the encoder 402B or 402C is configured to encode the k bits of input information to result in an output of n bits of encoded information. Here, the encoders 402B and 402C may be substantially the same encoder. In box B, a single channelization code having a reduced spreading factor of less than 256, e.g., SF=128 may be utilized to encode HARQ feedback onto the channel. In box C, after the n bits of encoded information are split into two paths that may be destined for dual uplink carriers, dual channelization codes having a spreading factor SF=256 may be utilized to encode HARQ feedback onto the channel. As will be described in further detail below, the channelization to encode the HARQ feedback in boxes B and C is quite similar, both enabling the grouping into groups of two downlink carriers to enable utilizing code books previously designed for conventional single carrier or DC-HSDPA systems. That is, in box B, with a single channelization code and a reduced spreading factor to SF=128, the HARQ feedback for a first group of downlink carriers may be placed into a first portion (e.g., half) of a time slot, and a second group of downlink carriers may be placed into a second portion (e.g., half) of the time slot. Whereas, in box C, with dual channelization codes, the HARQ feedback for a each of a first and a second group of downlink carriers may be placed in the same time slot, but separated in accordance with code division multiplexing by way of the dual channelization codes. For example, the dual channelization codes may be substantially orthogonal to one another such that they can be resolved at a receiver.

Figure 5:
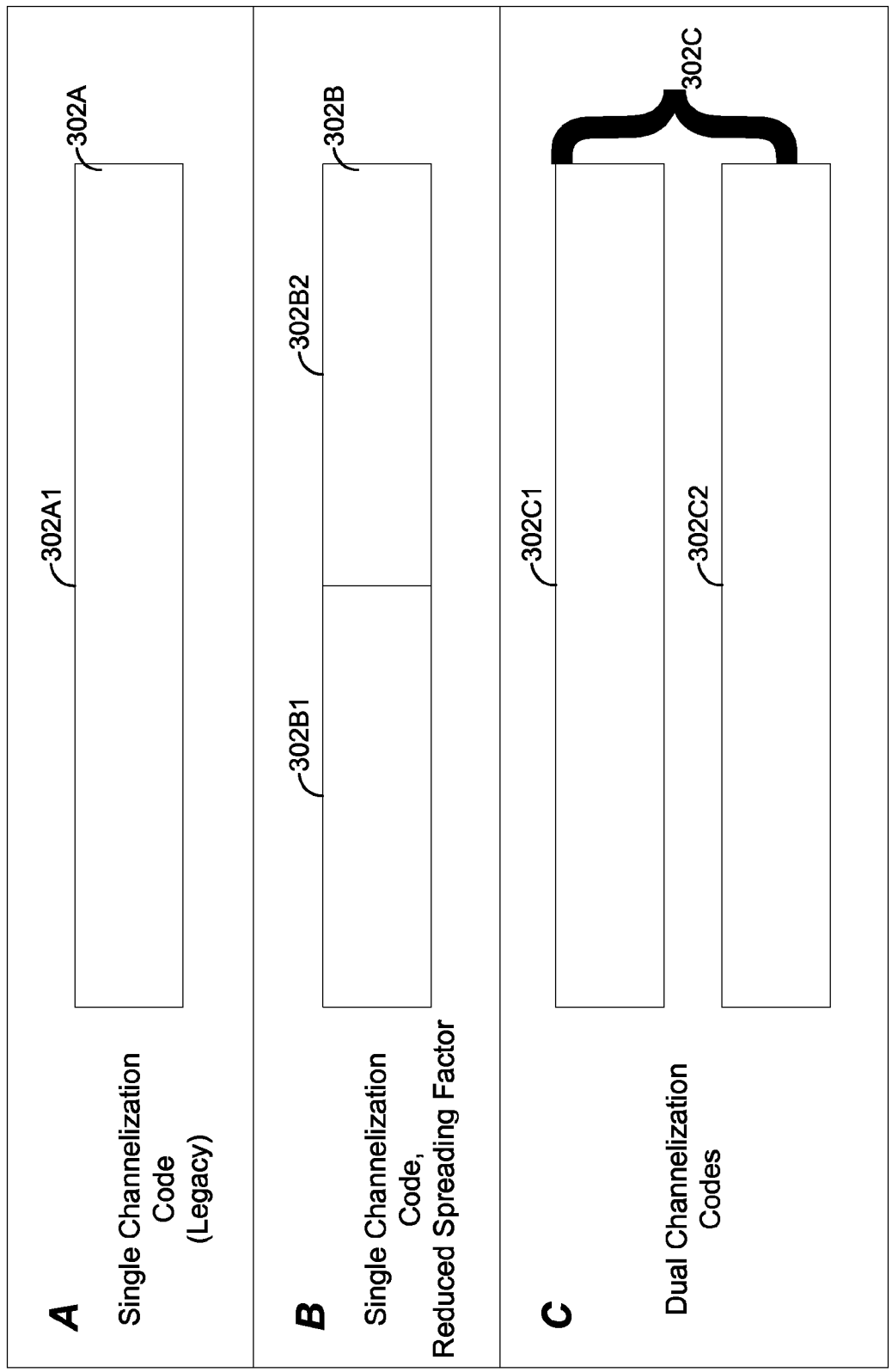
FIG. 5 is a block diagram conceptually illustrating three exemplary time slots within the HS-DPCCH for carrying HARQ feedback.

FIG. 5 illustrates a HARQ-ACK time slot 302 as illustrated in FIG. 3, in further detail. In FIG. 5, boxes A, B, and C illustrate a time slot for a single channelization code with SF=256, for a single channelization code with SF=128, and for dual channelization codes with SF=256, respectively. That is, boxes A-C in FIG. 5 correspond to boxes A-C in FIG. 4. Returning to FIG. 5, the time slot 302A in box A includes one field 302A1 in which a single channelization code symbol may be included. Here, as discussed above, a code book configured to provide HARQ feedback for all of the downlink carriers may be utilized so that a single channelization code symbol will suffice to provide feedback for all of the corresponding downlink carriers. In box B, time slot 302B includes two sequential fields 302B1 and 302B2. A respective channelization code symbol may be inserted into each of the two fields 302B1 and 302B2. Here, as described above, the spreading factor may be reduced, e.g., to SF=128. Thus, a channelization code symbol having the same length as the legacy case may be utilized within a half time slot instead of a full time slot. That is, a reduction in the spreading factor SF compresses information in time. When the spreading factor SF is reduced by a factor of two, the same portion of information that previously was sent in one time slot may now be sent in half of a time slot. Thus, reducing the spreading factor by two and grouping the downlink carriers into groups of two carriers enables two pre-existing code books designed for two-carrier systems to be utilized to provide HARQ feedback in a three- or four-carrier system, with the respective codes used in each half time slot.

As a simple example, if a four-carrier 4C-HSDPA system is configured such that the first two carriers are configured for SIMO, but the second two carriers are configured for MIMO (i.e., S/S/M/M), two of the carriers may be grouped into a first group (S/S), while the other two carriers may be grouped into a second group (M/M). Here, previous 3GPP standards defined in Release 8 for DC-HSDPA included a suitable code book for providing HARQ feedback for two carriers configured as S/S. Thus, this code book may be utilized to provide a channelization code symbol in the first half 302B1 of the time slot 302B. Similarly, previous 3GPP standards defined in Release 9 for DC-HSDPA+MIMO included a suitable code book for providing HARQ feedback for two carriers configured as M/M. Thus, this code book may be utilized to provide a channelization code symbol in the second half 302B2 of the time slot 302B. Of course, these examples of code books being re-used from previous 3GPP standards are only exemplary in nature, and in a particular implementation other codebooks from different pre-existing standards, other standards, or even new code books for encoding HARQ feedback for two downlink carriers may be utilized.

Box C illustrates an approach utilizing dual channelization codes, with a spreading factor SF=256. Here, the spreading factor is the same as that described in box A, so that a channelization code symbol takes the whole time slot 302C. However, dual channelization codes are utilized, so that, as described above with relation to box B, the four downlink carriers in a 4C-HSDPA system may be grouped into two groups of two carriers each, and the channelization codes provide code division multiplexing of the HARQ feedback for each of the two groups of two downlink carriers.

In a system with an odd number of downlink carriers for which to provide feedback, such as a 3C-HSDPA system, each of the three approaches illustrated in FIG. 5 may be utilized, however, one of the groups of downlink carriers will only include one downlink carrier. For example, in a 3-carrier system configured for SISO on the first two downlink carriers and MIMO on the third downlink carrier (i.e., S/S/M), a first group may include the first two carriers (S/S), while a second group may include the third carrier (M). Thus, HARQ feedback for the first group may utilize a channelization code book defined in Release 8 DC-HSDPA, while HARQ feedback for the second group may utilize a channelization code book defined in Release 7 DL-MIMO. Of course, as described above, these pre-existing codebooks from previous releases of 3GPP standards are only given as an illustrative example and are various aspects of the disclosure may utilize any other suitable code books.

In further embodiments, HARQ feedback for any number of downlink carriers may be provided by utilizing any number of code books that jointly encode the HARQ feedback for a corresponding number of groups of two downlink carriers.

Figure 6A:
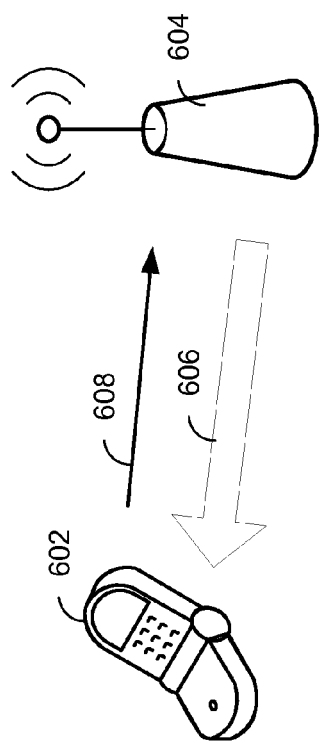
FIGS. 6A and 6B are simplified schematic diagrams of a UE in communication with a Node B in accordance with an exemplary aspect of the disclosure.
Figure 6B:
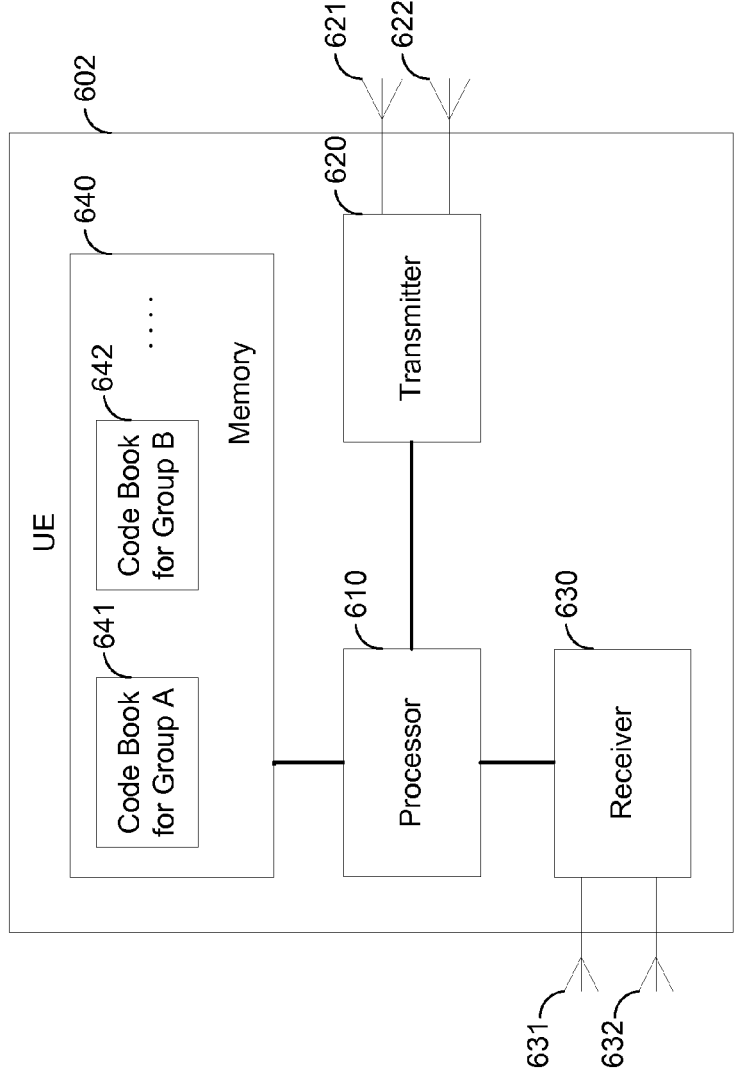

FIG. 6A is a simplified schematic diagram illustrating a UE 602 in communication with a Node B 604. Here, the Node B 604 transmits downlink signaling 606 on a plurality of downlink carriers, and the UE transmits HARQ feedback 608 on one or more uplink carriers. For example, the downlink signaling 606 may include four downlink carriers in a 4C-HSDPA system, and the HARQ feedback 608 may be provided on one uplink carrier. In other aspects of the disclosure, each of the downlink signaling 606 and the HARQ feedback 608 may be provided on any suitable number of carriers. FIG. 6B is a block diagram illustrating certain details of the UE 602. In the illustrated example, the UE 602 includes a processor 610 for performing functions such as determining HARQ feedback corresponding to each of the plurality of downlink carriers received in the downlink signaling 606. The processor 610 is in communication with a transmitter 620, a receiver 630, and a memory 640. The receiver 630 may include one or more receive antennas 631, 632 for receiving the downlink signaling 606, and the transmitter 620 may include one or more transmit antennas 621, 622 for transmitting the HARQ feedback 608 on the uplink. The memory 640 may include any suitable form of data structures such as a first code book 641 and a second code book 642 for storing HARQ feedback symbols corresponding to a status of the decoding of information received on a plurality of downlink carriers, such as a HARQ ACK, NACK, DTX, or PRE/POST. That is, the symbols stored in a code book such as the first code book 641 may encode HARQ feedback for a subset of the plurality of downlink carriers. Here, the subset may include any number of downlink carriers including one downlink carrier up to all of the downlink carriers. In an exemplary aspect of the disclosure, the first code book 641 may include HARQ feedback symbols for encoding HARQ feedback corresponding to two downlink carriers, and the second code book 642 may include HARQ feedback symbols for encoding HARQ feedback corresponding to a third downlink carrier. Of course, more than two code books may be stored in the memory 640, and each of the code books may be configured to store encoded HARQ feedback symbols corresponding to HARQ feedback for essentially any number of downlink carriers.

In another exemplary aspect of the disclosure, one of the code books stored in memory includes HARQ feedback symbols corresponding to HARQ feedback for three downlink carriers configured for SIMO transmission (S/S/S). In this aspect, when a UE 602 is configured for communication over three SIMO downlink channels (S/S/S), a single code book may encode HARQ feedback for all three carriers; when the UE 602 is configured for communication over any other setup (i.e., three carriers with at least one carrier configured for MIMO, or four carriers with zero or more carriers configured for MIMO), then code books for storing HARQ feedback symbols for encoding HARQ feedback for a subsets of one or two carriers may be accessed. That is, the changes to a legacy system needed to reduce the spreading factor or to utilize dual channelization codes may be larger than desired for a case such as S/S/S where the size of the codebook is relatively small. Thus, a special exception may be made in such a case to jointly encode the HARQ feedback for all of the downlink carriers into a single code book, and the feedback may be provided utilizing a single channelization code with a spreading factor SF=256, similar to a conventional case.

Figure 7:
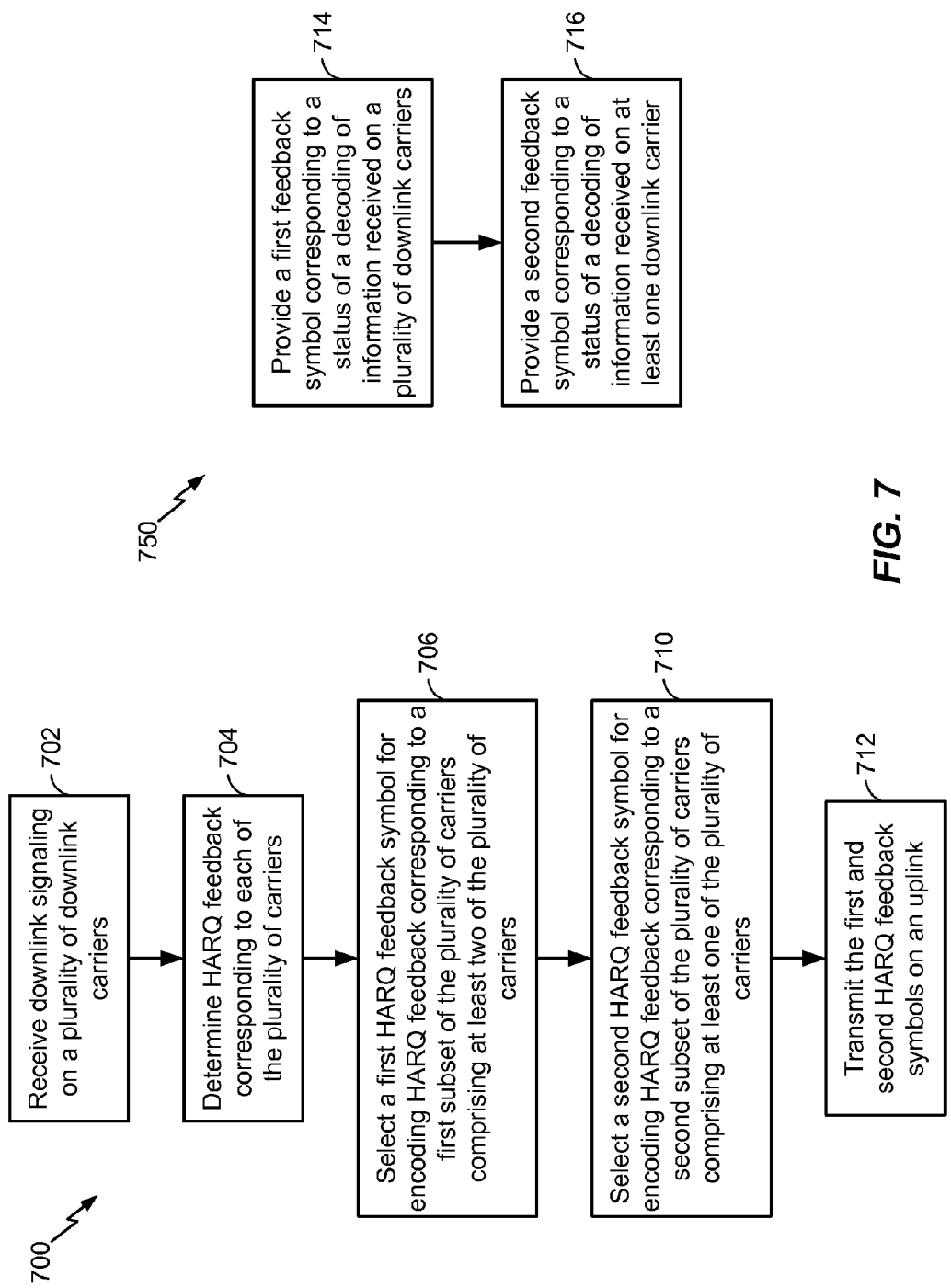
FIG. 7 is pair of flow charts illustrating an exemplary process in accordance with aspects of the disclosure.

FIG. 7 is a flow chart illustrating exemplary processes 700 and 750 of wireless communication according to an aspect of the disclosure, wherein HARQ feedback corresponding to the status of plural downlink carriers is grouped into two or more groups, and at least one of the two or more groups includes two of the downlink carriers. In process 700, in block 702, downlink signaling is received on a plurality of downlink carriers. For example, according to two exemplary aspects of the disclosure, downlink signaling may be received on three or four downlink carriers in a 3C-HSDPA or 4C-HSDPA system, respectively. In block 704, HARQ feedback is determined corresponding to each of the plurality of downlink carriers. For example, the processor 610 in FIG. 6B may determine whether the encoded information on the transport blocks on the corresponding downlink carrier is decoded correctly, or if anything received at all. In block 706, based on the HARQ feedback determined in block 704, a first HARQ feedback symbol for encoding the HARQ feedback corresponding to a first subset of the plurality of carriers including at least two of the plurality of carriers is selected. Similarly, in block 710, a second HARQ feedback symbol for encoding the HARQ feedback corresponding to a second subset of the plurality of carriers including at least one of the plurality of carriers is selected. In an exemplary aspect of the disclosure, the second subset may include two downlink carriers in a 4C-HSDPA system, or one carrier in a 3C-HSDPA system. In block 712, the first and second HARQ feedback symbols are transmitted on an uplink. In some aspects of the disclosure, the HARQ feedback symbols corresponding to the first subset may be encoded by modulating respective time slots in one or two uplink channels as described above and illustrated in FIGS. 4 and 5.

In process 750, in block 714, a first feedback symbol is provided, corresponding to a status of a decoding of information received on a plurality of downlink carriers (e.g., HARQ feedback). In block 716, a second feedback symbol is provided, corresponding to a status of a decoding of information received on at least one downlink carrier. For example, for a 4C-HSDPA system, the first feedback symbol may include HARQ feedback for a first and second downlink carrier, and the second feedback symbol may include HARQ feedback for a third and fourth downlink carrier. For a 3C-HSDPA system, the second symbol may only include HARQ feedback for the third downlink carrier.

Figure 8:
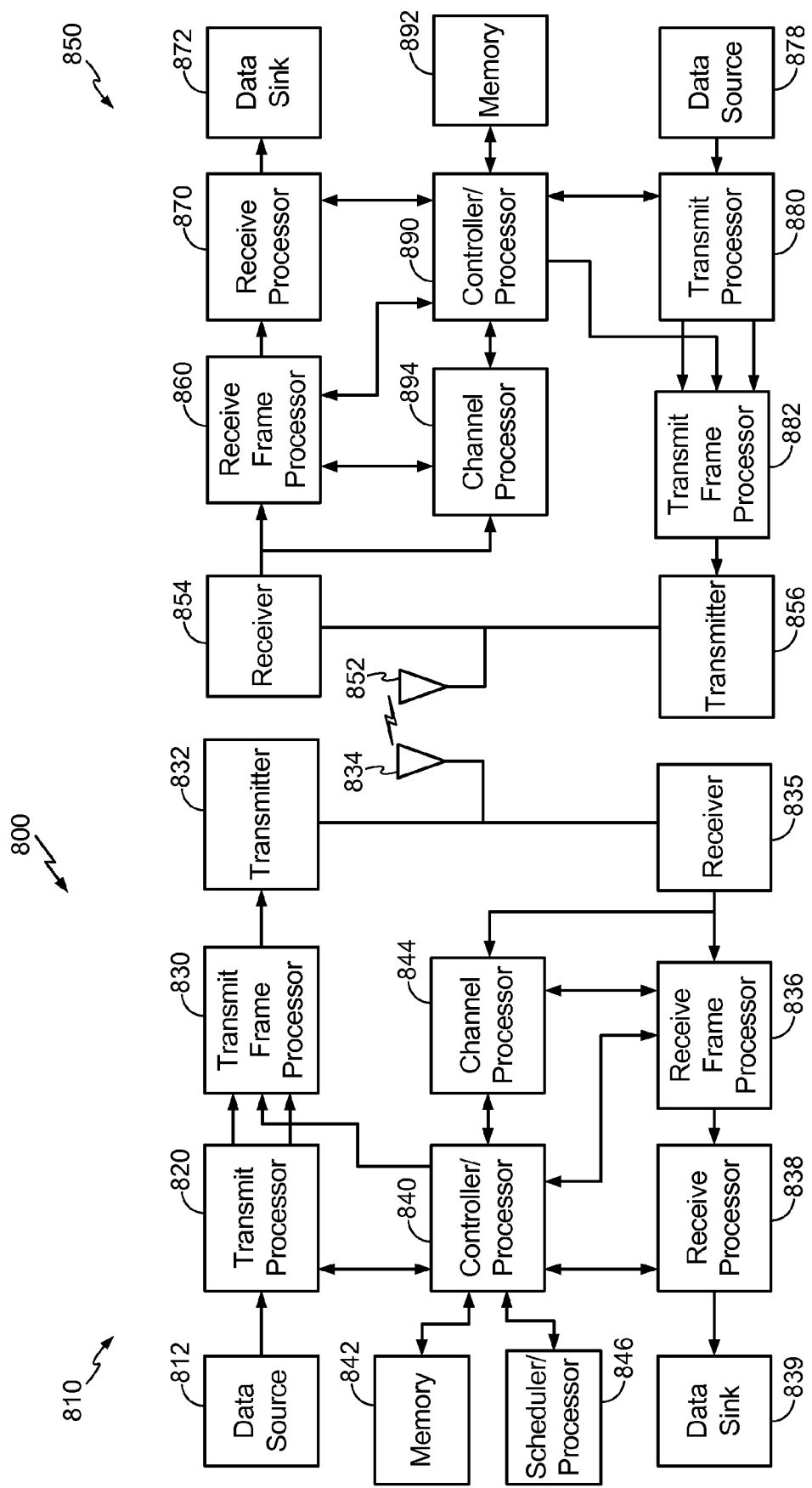
FIG. 8 is a block diagram conceptually illustrating an example of a Node B in communication with a UE in a telecommunications system.

FIG. 8 is a block diagram of a Node B 810 in communication with a UE 850, where the Node B 810 may be the Node B 208 in FIG. 2, and the UE 850 may be the UE 210 in FIG. 2. In the downlink communication, a transmit processor 820 may receive data from a data source 812 and control signals from a controller/processor 840. The transmit processor 820 provides various signal processing functions for the data and control signals, as well as reference signals (e.g., pilot signals). For example, the transmit processor 820 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 844 may be used by a controller/processor 840 to determine the coding, modulation, spreading, and/or scrambling schemes for the transmit processor 820. These channel estimates may be derived from a reference signal transmitted by the UE 850 or from feedback from the UE 850. The symbols generated by the transmit processor 820 are provided to a transmit frame processor 830 to create a frame structure. The transmit frame processor 830 creates this frame structure by multiplexing the symbols with information from the controller/processor 840, resulting in a series of frames. The frames are then provided to a transmitter 832, which provides various signal conditioning functions including amplifying, filtering, and modulating the frames onto a carrier for downlink transmission over the wireless medium through antenna 834. The antenna 834 may include one or more antennas, for example, including beam steering bidirectional adaptive antenna arrays or other similar beam technologies.

At the UE 850, a receiver 854 receives the downlink transmission through an antenna 852 and processes the transmission to recover the information modulated onto the carrier. The information recovered by the receiver 854 is provided to a receive frame processor 860, which parses each frame, and provides information from the frames to a channel processor 894 and the data, control, and reference signals to a receive processor 870. The receive processor 870 then performs the inverse of the processing performed by the transmit processor 820 in the Node B 810. More specifically, the receive processor 870 descrambles and despreads the symbols, and then determines the most likely signal constellation points transmitted by the Node B 810 based on the modulation scheme. These soft decisions may be based on channel estimates computed by the channel processor 894. The soft decisions are then decoded and deinterleaved to recover the data, control, and reference signals. The CRC codes are then checked to determine whether the frames were successfully decoded. The data carried by the successfully decoded frames will then be provided to a data sink 872, which represents applications running in the UE 850 and/or various user interfaces (e.g., display). Control signals carried by successfully decoded frames will be provided to a controller/processor 890. When frames are unsuccessfully decoded by the receiver processor 870, the controller/processor 890 may also use an acknowledgement (ACK) and/or negative acknowledgement (NACK) protocol to support retransmission requests for those frames.

In the uplink, data from a data source 878 and control signals from the controller/processor 890 are provided to a transmit processor 880. The data source 878 may represent applications running in the UE 850 and various user interfaces (e.g., keyboard). Similar to the functionality described in connection with the downlink transmission by the Node B 810, the transmit processor 880 provides various signal processing functions including CRC codes, coding and interleaving to facilitate FEC, mapping to signal constellations, spreading with OVSFs, and scrambling to produce a series of symbols. Channel estimates, derived by the channel processor 894 from a reference signal transmitted by the Node B 810 or from feedback contained in the midamble transmitted by the Node B 810, may be used to select the appropriate coding, modulation, spreading, and/or scrambling schemes. The symbols produced by the transmit processor 880 will be provided to a transmit frame processor 882 to create a frame structure. The transmit frame processor 882 creates this frame structure by multiplexing the symbols with information from the controller/processor 890, resulting in a series of frames. The frames are then provided to a transmitter 856, which provides various signal conditioning functions including amplification, filtering, and modulating the frames onto a carrier for uplink transmission over the wireless medium through the antenna 852.

The uplink transmission is processed at the Node B 810 in a manner similar to that described in connection with the receiver function at the UE 850. A receiver 835 receives the uplink transmission through the antenna 834 and processes the transmission to recover the information modulated onto the carrier. The information recovered by the receiver 835 is provided to a receive frame processor 836, which parses each frame, and provides information from the frames to the channel processor 844 and the data, control, and reference signals to a receive processor 838. The receive processor 838 performs the inverse of the processing performed by the transmit processor 880 in the UE 850. The data and control signals carried by the successfully decoded frames may then be provided to a data sink 839 and the controller/processor, respectively. If some of the frames were unsuccessfully decoded by the receive processor, the controller/processor 840 may also use an acknowledgement (ACK) and/or negative acknowledgement (NACK) protocol to support retransmission requests for those frames.

The controller/processors 840 and 890 may be used to direct the operation at the Node B 810 and the UE 850, respectively. For example, the controller/processors 840 and 890 may provide various functions including timing, peripheral interfaces, voltage regulation, power management, and other control functions. The computer readable media of memories 842 and 892 may store data and software for the Node B 810 and the UE 850, respectively. A scheduler/processor 846 at the Node B 810 may be used to allocate resources to the UEs and schedule downlink and/or uplink transmissions for the UEs.

In one configuration, the apparatus 850 for wireless communication includes means for receiving downlink signaling on a plurality of downlink carriers and means for transmitting the first and second HARQ feedback symbols on an uplink. In one aspect, the aforementioned means may be the receiver 854, receive frame processor 860, and receive processor 870; and the transmitter 856, transmit frame processor 882, and transmit processor 880, respectively. Further, the apparatus 850 according to this configuration includes means for determining hybrid automatic repeat request (HARQ) feedback corresponding to each of the plurality of carriers, means for selecting a first HARQ feedback symbol for encoding HARQ feedback corresponding to a first subset of the plurality of carriers comprising at least two of the plurality of carriers, and means for selecting a second HARQ feedback symbol for encoding HARQ feedback corresponding to a second subset of the plurality of carriers comprising at least one of the plurality of carriers. In one aspect, the aforementioned means may be the channel processor 894 and/or the controller/processor 890. In another aspect, the aforementioned means may be a module or any apparatus configured to perform the functions recited by the aforementioned means.

In another configuration, the apparatus 850 for wireless communication includes means for providing a first feedback symbol corresponding to a status of decoding information received on a plurality of downlink carriers and means for providing a second feedback symbol corresponding to a status of decoding information received on at least one downlink carrier. In one aspect the aforementioned means may be the controller/processor 890, channel processor 894, transmit processor 880, transmit frame processor 882, and/or transmitter 856. In another aspect, the aforementioned means may be a module or any apparatus configured to perform the functions recited by the aforementioned means.

Several aspects of a telecommunications system have been presented with reference to a W-CDMA system. As those skilled in the art will readily appreciate, various aspects described throughout this disclosure may be extended to other telecommunication systems, network architectures and communication standards. That is, the modulation and multiple access scheme employed by an access network in accordance with various aspects of the disclosure may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method of wireless communication comprising:
   receiving downlink signaling on a plurality of downlink carriers;
   determining hybrid automatic repeat request (HARQ) feedback corresponding to each of the plurality of carriers;
   selecting a first HARQ feedback symbol for encoding HARQ feedback corresponding to a first subset of the plurality of carriers comprising at least two of the plurality of carriers;
   selecting a second HARQ feedback symbol for encoding HARQ feedback corresponding to a second subset of the plurality of carriers comprising at least one of the plurality of carriers; and
   transmitting the first and second HARQ feedback symbols on an uplink,
   wherein the transmitting comprises modulating a first portion of a time slot of an uplink carrier with the first HARQ feedback symbol and modulating a second portion of the time slot of the uplink carrier, other than the first portion of the time slot, with the second HARQ feedback symbol.

2. The method of claim 1, wherein the modulating of the first and second portions of the uplink carrier each comprises utilizing a spreading factor of less than 256 chips per bit.

3. The method of claim 1, wherein the spreading factor is 128.

4. A method of wireless communication comprising:
   providing a first feedback symbol corresponding to a status of decoding information received on a plurality of downlink carriers, wherein the plurality of downlink carriers comprises a first downlink carrier and a second downlink carrier; and
   providing a second feedback symbol corresponding to a status of decoding information received on at least one downlink carrier,
   wherein the first feedback symbol is provided in a first portion of a time slot of an uplink channel, and the second feedback symbol is provided in a second portion of the time slot of the uplink channel other than the first portion of the time slot, and wherein the providing of the first and second feedback symbols each comprises modulating the respective first and second portions of the time slot of the uplink channel with the first and second feedback symbols, respectively.

5. The method of claim 4, wherein the at least one downlink carrier consists of a third downlink carrier.

6. The method of claim 4, wherein the at least one downlink carrier consists of a third downlink carrier and a fourth downlink carrier.

7. The method of claim 4, wherein the modulating of the respective first and second portions of the time slot of the uplink channel each comprises utilizing a spreading factor of less than 256 chips per bit.

8. The method of claim 7, wherein the spreading factor is 128.

9. The method of claim 4, wherein the providing of the first feedback symbol comprises modulating a time slot of an uplink channel with the first feedback symbol; and the providing of the second feedback symbol comprises modulating the time slot of the uplink channel with the second feedback symbol.

10. An apparatus for wireless communication comprising:
a receiver for receiving downlink signaling on a plurality of downlink carriers;
a processor for determining hybrid automatic repeat request (HARQ) feedback corresponding to each of the plurality of carriers, selecting a first HARQ feedback symbol for encoding HARQ feedback corresponding to a first subset of the plurality of carriers comprising at least two of the plurality of carriers, and selecting a second HARQ feedback symbol for encoding HARQ feedback corresponding to a second subset of the plurality of carriers comprising at least one of the plurality of carriers; and
a transmitter for transmitting the first and second HARQ feedback symbols on an uplink,
wherein the transmitter is configured to modulate a first portion of a time slot of an uplink carrier with the first HARQ feedback symbol and a second portion of the time slot of the uplink carrier, other than the first portion of the time slot, with the second HARQ feedback symbol.

11. The apparatus of claim 10, wherein the modulating of the first and second portions of the uplink carrier each comprises utilizing a spreading factor of less than 256 chips per bit.

12. The apparatus of claim 11, wherein the spreading factor is 128.

13. An apparatus for wireless communication comprising:
means for receiving downlink signaling on a plurality of downlink carriers;
means for determining hybrid automatic repeat request (HARQ) feedback corresponding to each of the plurality of carriers;
means for selecting a first HARQ feedback symbol for encoding HARQ feedback corresponding to a first subset of the plurality of carriers comprising at least two of the plurality of carriers;
means for selecting a second HARQ feedback symbol for encoding HARQ feedback corresponding to a second subset of the plurality of carriers comprising at least one of the plurality of carriers; and
means for transmitting the first and second HARQ feedback symbols on an uplink,
wherein the means for transmitting comprises means for modulating a first portion of a time slot of an uplink carrier with the first HARQ feedback symbol and a second portion of the time slot of the uplink carrier, other than the first portion of the slot with the second HARQ feedback symbol.

14. The apparatus of claim 13, wherein the means for modulating the first and second portions of the uplink carrier each comprises means for utilizing a spreading factor of less than 256 chips per bit.

15. The apparatus of claim 14, wherein the spreading factor is 128.

16. An apparatus for wireless communication comprising:
means for providing a first feedback symbol corresponding to a status of decoding information received on a plurality of downlink carriers, wherein the plurality of downlink carriers comprises a first downlink carrier and a second downlink carrier; and
means for providing a second feedback symbol corresponding to a status of decoding information received on at least one downlink carrier,
wherein the first feedback symbol is provided in a first portion of a time slot of an uplink channel, and the second feedback symbol is provided in a second portion of the time slot of the uplink channel other than the first portion of the time slot, and wherein the providing of the first and second feedback symbols each comprises modulating the respective first and second portions of the time slot of the uplink channel with the first and second feedback symbols, respectively.

17. The apparatus of claim 16, wherein the at least one downlink carrier consists of a third downlink carrier.

18. The apparatus of claim 16, wherein the at least one downlink carrier consists of a third downlink carrier and a fourth downlink carrier.

19. The apparatus of claim 16, wherein the means for modulating the respective first and second portions of the time slot of the uplink channel each comprises means for utilizing a spreading factor of less than 256 chips per bit.

20. The apparatus of claim 19, wherein the spreading factor is 128.

21. A computer program product, comprising:
a non-transitory computer-readable medium comprising:
instructions for causing a computer to receive downlink signaling on a plurality of downlink carriers;
instructions for causing a computer to determine hybrid automatic repeat request (HARQ) feedback corresponding to each of the plurality of carriers;
instructions for causing a computer to select a first HARQ feedback symbol for encoding HARQ feedback corresponding to a first subset of the plurality of carriers comprising at least two of the plurality of carriers;
instructions for causing a computer to select a second HARQ feedback symbol for encoding HARQ feedback corresponding to a second subset of the plurality of carriers comprising at least one of the plurality of carriers; and
instructions for causing a computer to transmit the first and second HARQ feedback symbols on an uplink,
wherein the instructions for causing a computer to transmit comprise instructions for causing a computer to modulate a first portion of a time slot of an uplink carrier with the first HARQ feedback symbol and modulate a second portion of the time slot of the uplink carrier, other than the first portion of the time slot, with the second HARQ feedback symbol.

22. The computer program product of claim 21, wherein the instructions for causing a computer to modulate the first and second portions of the uplink carrier each comprises instructions for causing a computer to utilize a spreading factor of less than 256 chips per bit.

23. The computer program product of claim 22, wherein the spreading factor is 128.

24. A computer program product, comprising:
a non-transitory computer-readable medium comprising:
instructions for causing a computer to provide a first feedback symbol corresponding to a status of decoding information received on a plurality of downlink carriers, wherein the plurality of downlink carriers comprises a first downlink carrier and a second downlink carrier; and instructions for causing a computer to provide a second feedback symbol corresponding to a status of decoding information received on at least one downlink carrier, wherein the first feedback symbol is provided in a first portion of a time slot of an uplink channel, and the second feedback symbol is provided in a second portion of the time slot of the uplink channel other than the first portion of the time slot, and wherein the providing of the first and second feedback symbols each comprises modulating the respective first and second portions of the time slot of the uplink channel with the first and second feedback symbols, respectively.

25. The computer program product of claim 24, wherein the at least one downlink carrier consists of a third downlink carrier.

26. The computer program product of claim 24, wherein the at least one downlink carrier consists of a third downlink carrier and a fourth downlink carrier.

27. The computer program product of claim 24, wherein the instructions for causing a computer to modulate the respective first and second portions of the time slot of the uplink channel each comprise instructions for causing a computer to utilize a spreading factor of less than 256 chips per bit.

28. The computer program product of claim 27, wherein the spreading factor is 128.

29. An apparatus for wireless communication, comprising:
at least one processor; and
a memory coupled to the at least one processor,
wherein the at least one processor is configured to:
receive downlink signaling on a plurality of downlink carriers;
determine hybrid automatic repeat request (HARQ) feedback corresponding to each of the plurality of carriers;
select a first HARQ feedback symbol for encoding HARQ feedback corresponding to a first subset of the plurality of carriers comprising at least two of the plurality of carriers;
select a second HARQ feedback symbol for encoding HARQ feedback corresponding to a second subset of the plurality of carriers comprising at least one of the plurality of carriers; and
transmit the first and second HARQ feedback symbols on an uplink,
wherein the transmitting comprises modulating a first portion of a time slot of an uplink carrier with the first HARQ feedback symbol and modulating a second portion of the time slot of the uplink carrier, other than the first portion of the time slot, with the second HARQ feedback symbol.

30. The apparatus of claim 29, wherein the modulating of the first and second portions of the uplink carrier each comprises utilizing a spreading factor of less than 256 chips per bit.

31. The apparatus of claim 30, wherein the spreading factor is 128.

* * * * *